UNITED STATES PATENT OFFICE.

CHARLES MORGENTHALER, OF PHILADELPHIA, PENNSYLVANIA.

ARTIFICIAL PUMICE-STONE.

SPECIFICATION forming part of Letters Patent No. 561,683, dated June 9, 1896.

Application filed December 17, 1895. Serial No. 572,462. (Specimens.)

*To all whom it may concern:*

Be it known that I, CHARLES MORGENTHALER, a citizen of the United States, residing at Philadelphia, in the county of Philadelphia and State of Pennsylvania, have invented certain new and useful Improvements in Artificial Pumice-Stone; and I do declare the following to be a full, clear, and exact description of the invention, such as will enable others skilled in the art to which it appertains to make and use the same.

This invention relates to the composition of several substances to produce an artificial pumice-stone to be used for rubbing down varnished surfaces so as to get them smooth, as is generally done in carriage-work or on fine furniture, also for polishing marble and rubbing the flesh off of hides in leather manufactories, or in finishing oil-cloth to rub off the rough surfaces, and for any general polishing that requires a flat, hard, sharp, yet smooth polisher.

My composition consists of the following ingredients, combined as follows: pipe-clay, eighteen pounds; pumice-stone, (lava,) eighteen pounds; sandstone, eighteen pounds; limestone, nine pounds; water, enough to bring to the consistency of thin mortar.

To obtain the best results, I first crush the pipe-clay, pumice-stone, sandstone, and limestone, and then grind the pumice-stone, sandstone, and limestone and put them through fine sieves. The pipe-clay I mix in water and put through a sieve in a liquid state. To this liquid I add the powdered pumice-stone, sandstone, and limestone and stir all together, adding enough water to bring to the consistency of a thin mortar, so that when ladled into molds the composition will float to a natural level on top.

After well mixing the above I ladle it into molds, that have been previously greased, so the composition will not stick to the bottom or sides. These molds are preferably made of tin and are generally six inches long by three inches wide by three inches deep, making a finished briquet about five and one-half inches long by two and three-fourths inches wide and two and one-half inches high, this being a size nicely adapted to be firmly held in the hand or hands of the user. The filled molds should stand from sixteen to twenty-four hours, or until enough water has dried out to allow of handling the wet bricks. Then turn them out on a board or other flat surface and place them in a warm room until dry. About a week is usually required in the drying-room. When thoroughly dry, set them in a kiln and case them in with fire-plates to keep the flames from touching them (the same as when pottery-ware is fired) and bring them to a white heat, keeping up the white heat steadily for seventy-two hours. After this let them stay in the kiln till they are cool, as bringing them into the outer air while hot will crack them. When cool, finish the polishing-face by rubbing it on some hard flat roughened surface.

This stone is not mixed stiff like dough and put into the molds by hand, but is ladled in in a semiliquid state and settles to its shape naturally, surely, and evenly, making it more uniform. It is much "sharper" than if made without the pumice-stone. It is much firmer than if made up with flour or other "soft" materials, and it is much lighter in color than if made up with burnt sandstone.

I am aware that a stone has been invented and a patent granted to Julius Irion, November 22, 1881, No. 249,839, including some of the above ingredients, also that pumice-stone in its pure state is sometimes used for polishing purposes; but I do not believe that all the ingredients of my composition have been used together in the proportions stated.

Having thus described my invention, I claim as new and desire to secure by Letters Patent—

The herein-described composition consisting of pipe-clay, pumice-stone, sandstone, limestone and water, prepared, mixed and baked, substantially as set forth.

In testimony whereof I affix my signature in presence of two witnesses.

CHARLES MORGENTHALER.

Witnesses:
JOSEPH SCHNITZ,
JOHN HARTZAG.